Dec. 9, 1958　　　　　　R. TATSCH　　　　　2,863,606
　　SLIP TOGETHER-SNAP TOGETHER CONVECTOR AND
　　　　　　CONDUCTIVE CONDUIT MEANS
Filed April 4, 1955　　　　　　　　　　　5 Sheets-Sheet 1

INVENTOR
RICHARD TATSCH
BY:
ATT'YS

Dec. 9, 1958  R. TATSCH  2,863,606
SLIP TOGETHER-SNAP TOGETHER CONVECTOR AND
CONDUCTIVE CONDUIT MEANS
Filed April 4, 1955  5 Sheets-Sheet 2

INVENTOR
RICHARD TATSCH
BY: *George M. Riches*
ATT'YS

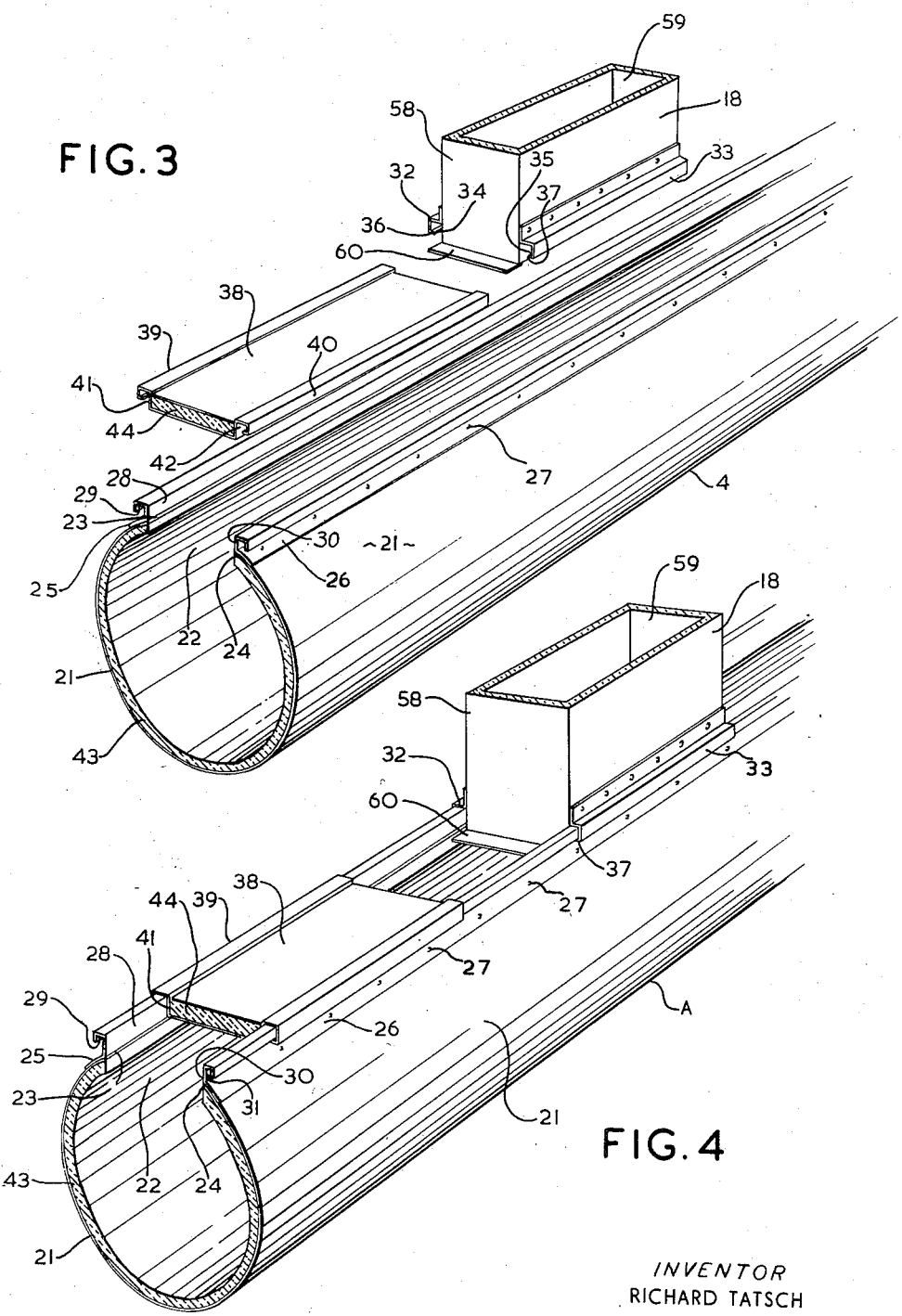

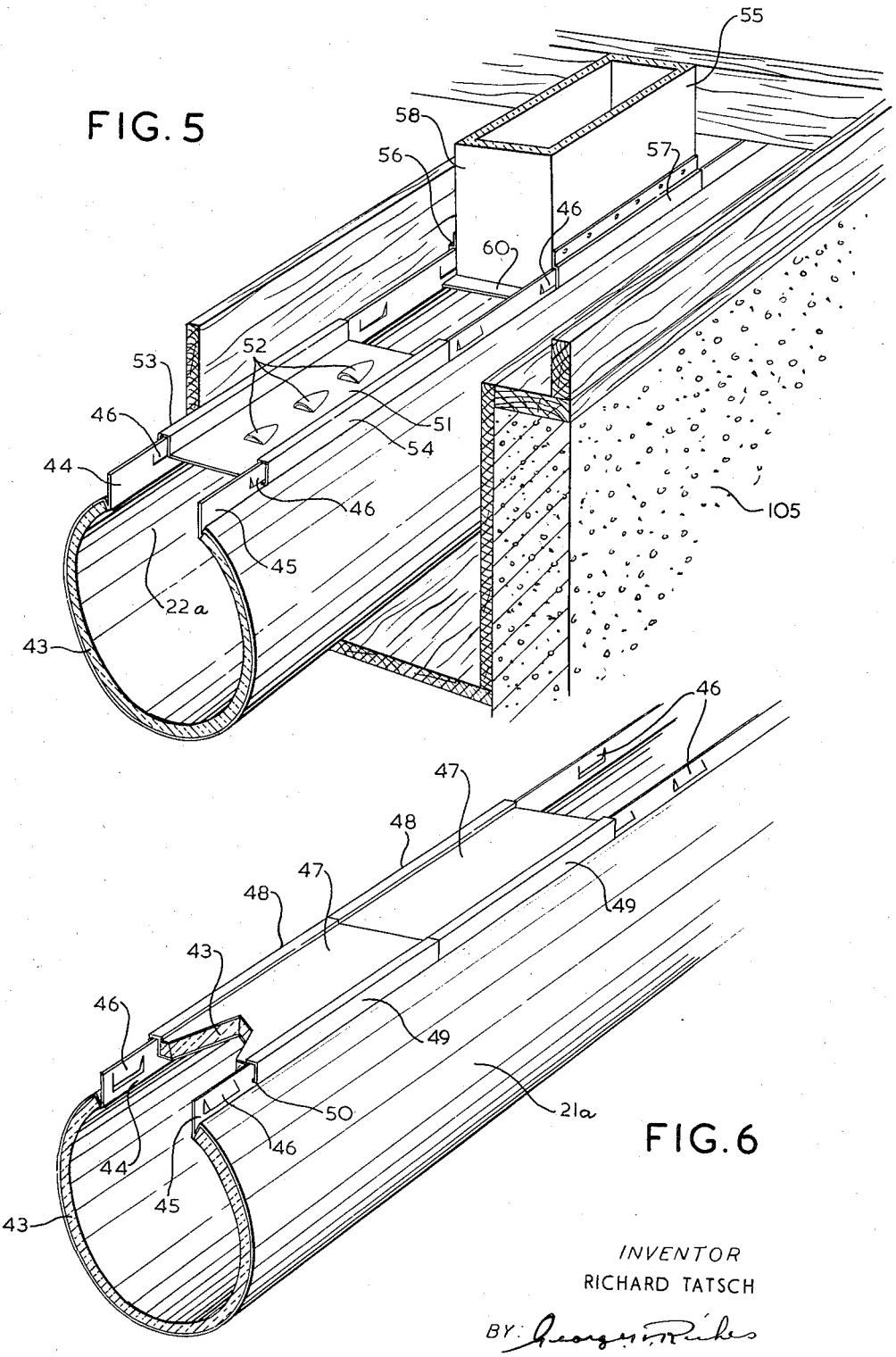

Dec. 9, 1958  R. TATSCH  2,863,606
SLIP TOGETHER-SNAP TOGETHER CONVECTOR AND
CONDUCTIVE CONDUIT MEANS
Filed April 4, 1955  5 Sheets-Sheet 5

INVENTOR
RICHARD TATSCH
BY
ATT'YS

United States Patent Office 2,863,606
Patented Dec. 9, 1958

2,863,606

SLIP TOGETHER-SNAP TOGETHER CONVECTOR AND CONDUCTIVE CONDUIT MEANS

Richard Tatsch, Silver City, N. Mex.

Application April 4, 1955, Serial No. 499,018

10 Claims. (Cl. 237—69)

This invention relates to a conduit system for a heat transfer system commonly known as air conditioning heating systems and in particular to the construction of the conduits and the conduit system.

The present invention relates to air conditioned perimeter heating of which there are basically five types namely: the loop system; the radial system; the lateral system; the crawl space duct system and the crawl space plenum system. In some applications the energy transfer will take place primarily by convection and in others, the transfer will be by a combination of convective and/or radiant panel transfer.

One object of the present invention relates particularly to the construction of the conduits whereby the conduit can be used for either convective heat transfer, conductive heat transfer, radiant panel transfer or a combination of the foregoing means of heat transfer. In carrying out the invention the main distribution conduit is formed by interconnected duct sections which are constructed in accordance with the present invention to which is connected such branch lines as may be necessary. Each section is provided with a continuous slot opening, usually to be held at uniform width irrespective of the conduit diameter or cross sectional areas by means of cover plates, the length of the sections being such that they are easily handled during installation. The use of the term "continuous slot opening" used herein does not imply that the openings necessarily all face in the same direction. Any section or group of sections may be rotated relative to the other sections so that the direction of the slot opening or openings be different from the adjoining section or sections depending upon the angle required for any particular fluid diversion head which is used as a take off from the main conduit.

Another object of the invention is to provide a means for the optional positioning of fluid convector outlets.

For an understanding of the present invention and the construction of the same and its application to a heating system, reference is to be had to the following description and the accompanying drawings which exemplify one or more embodiments of the same.

Figure 3 is an exploded view of a sectional unit shown in Figure 1 and which is constructed in accordance with the present invention.

Figure 4 represents the components shown in Figure 3 in an engaged relationship.

Figure 5 is a further alternative construction.

Figure 6 is a further modified construction.

Figure 1:
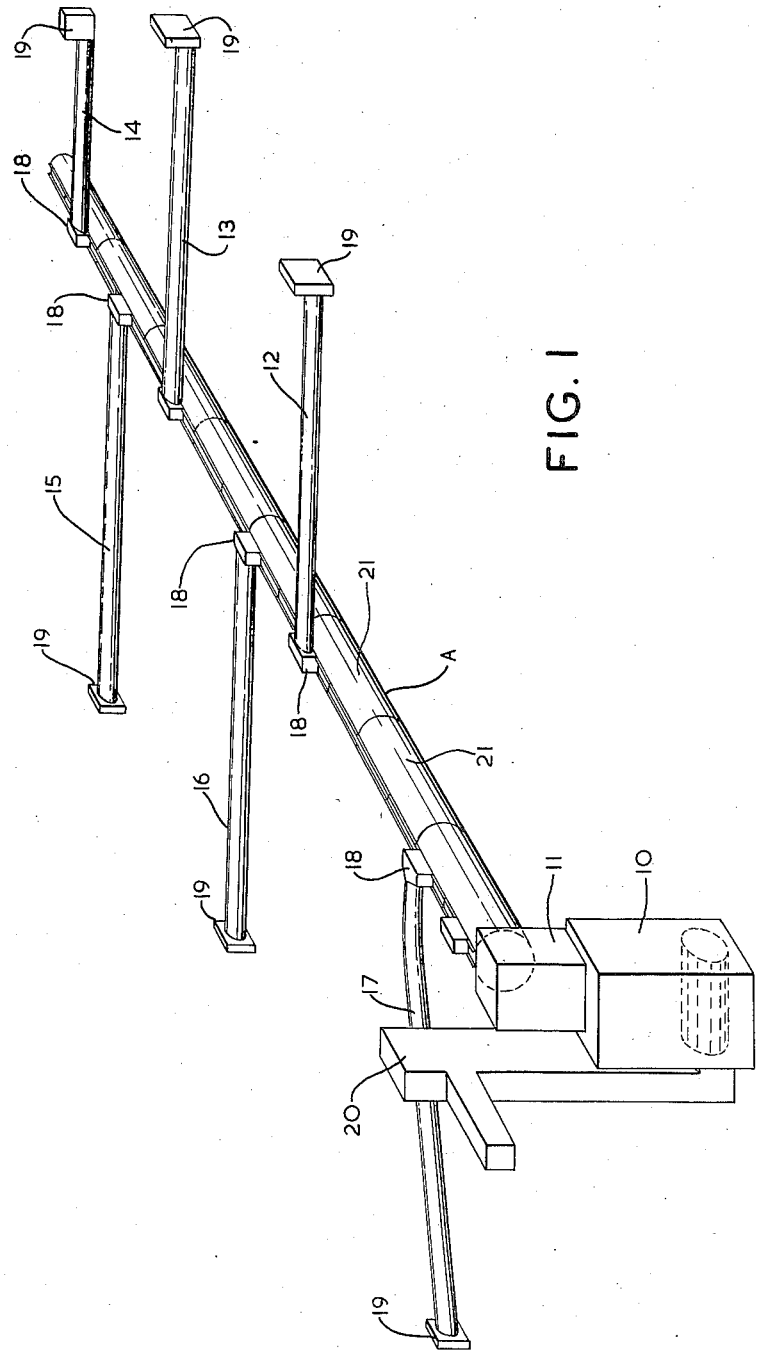
Figure 1 is a diagrammatic perspective view of a conduit system constructed of the sectional units of the present invention to form a main distribution line which delivers controlled amount of conditioned fluid to a plurality of radial branch pipes.

Figure 1 is a diagrammatic view illustrating a trunk line with feeders which may be located beneath an open sub-structure; in an attic area; or imbedded in a concrete floor and includes a heating unit 10 of the air conditioning type which is provided with the usual mechanical blower for forcing the heated and conditioned air into a plenum 11 and thence into a continuous conduit made of a number of sectional units which are constructed in accordance with the present invention, the conduit A delivering heated conditioned air by combination of convective transfer and radiant panel transfer to the several rooms of the house by means of branch fluid lines 12, 13, 14, 15, 16 and 17, each branch line being connected to the continuous conduit A by means of fluid diversion heads 18 and delivering it to the room to be heated through a convector outlet 19. The fluid diversion heads will be more particularly described in conjunction with the specific construction of the sections which form the conduit. The air returns to the conditioning unit through the return conduit 20.

Figure 2:
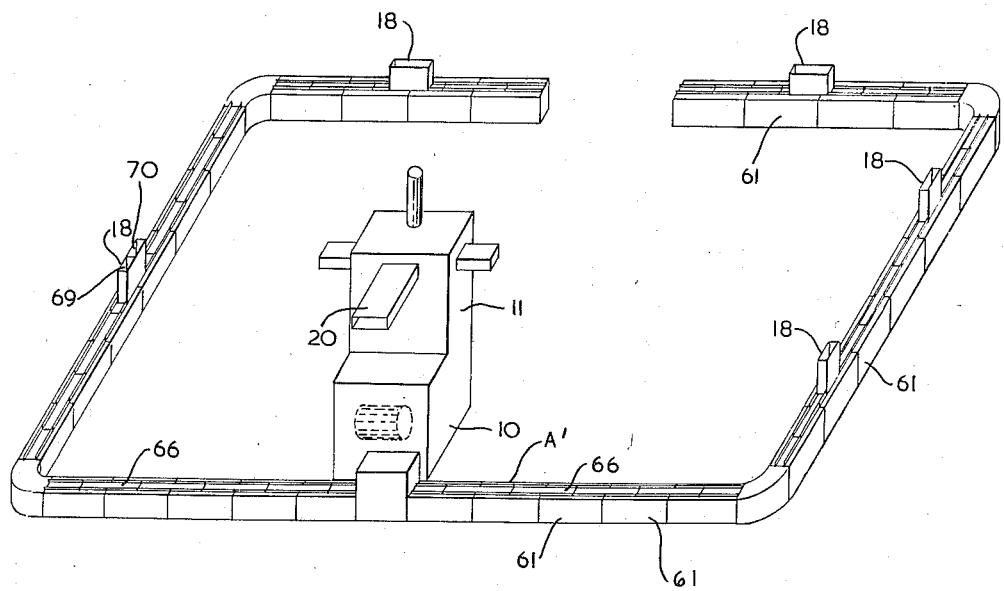
Figure 2 is a diagrammatic plan view illustrating the invention applied to a perimeter heating system, in which the sections are rectangular in cross section as illustrated in Figure 7.
Figure 8:
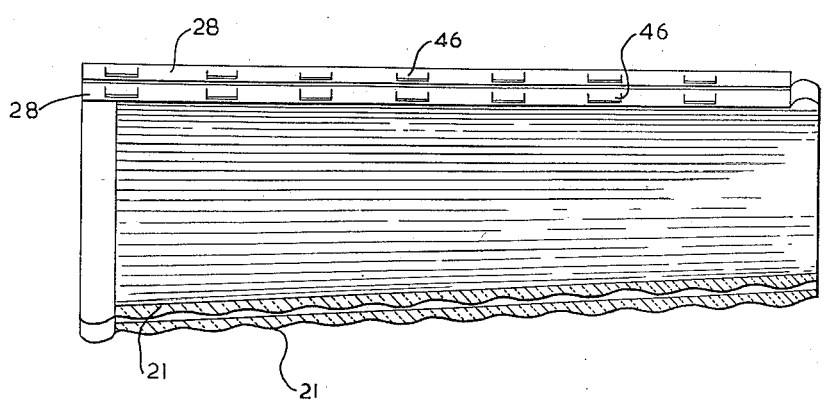
Figure 8 is a transverse section of tapered sections showing them nested one within the other to conserve space.

The continuous conduits A Figure 1 and A' of the Figure 2 are made of sections, each section being of uniform diameter, either round or square, or the sections may be tapered as herein described to provide a uniformly tapered conduit to control the flow of conditioned air so that the flow of the conditioned air therethrough will be in accordance with the requirements of the room or space which is to be heated. Each form of construction has its advantages. For example, if a tapered section is employed, the sections may be nested as shown in Figure 8 for shipment to the site where it is to be installed. Therefore, the invention is not limited to the particular shape of the conduit or sections. It is contemplated that the conduit of the present invention may be embodied in a structure, such as a house, by being placed immediately under the floor of the space to be heated, such as a crawl space for houses that are built without a basement, or it may be enclosed in the cement floor etc. The sections, therefore, should be constructed of a material that possesses adequate structural stability and must have proper thermal barriers which will be more particularly described.

Figures 3 and 4 illustrate one of the sections used in forming the continuous conduit A. Each section comprises a body 21 of a length which will require several of them to form the continuous conduit A, the body being split longitudinally to form a continuous slot 22 defined by the edges 23, 24 respectively. Connecting members 25, 26 are secured along the edges 23, 24 respectively, the members 25, 26 being secured in place by rivets 27. The member 25 has an upstanding collar 28, the top edge being folded downwardly to form an inverted U-channel 29 extending the full length of the connecting member 25. The member 26 has a corresponding collar 30, the top edge of which is folded downwardly to form an inverted U-channel 31. Each of the connecting members 25, 26 with their respective collars and flanges may be made of resilient material so that the channels 29, 31 will have a spring-like action for the purpose hereinafter described. Each fluid diversion head 18 is connected, in position, to one of the sections by means of connecting members 32, 33, extending longitudinally along the opposite sides of the heads adjacent the bottom edge thereof, the members 32, 33 being formed to provide a channel 34, 35 respectively for receiving the connecting members 25, 26, respectively with their related parts. The members 32, 33 have their bottom edges turned inwardly to form lips 36, 37 which engage under the channels 29, 31 respectively.

The continuous slot is closed by a series of cover plates 38, each cover plate having a connecting member 39, 40 of a shape corresponding to the connecting members 36, 37 with their related parts. It is preferable to have the cover plates 38 and the diversion heads of the same length so that they are interchangeable, one with the other. The length of the cover plates should preferably be such that a predetermined number of cover plates will be equal to the length of one section without overlapping the next unit. By such an arrangement, the fluid diversion heads may be positioned at any point along the slot openings without requiring any adjustment in the length of the cover plates. In other words, the cover plates and fluid diversion heads are interchangeable. In the construction shown in Figures 3 and 4, the diversion heads and cover plates may be fitted to the body 21 by sliding the channels 29, 31 through the channels 34, 35 of the diversion heads and the channels 41, 42 of the cover plates.

The body 21 is provided with insulation 43 of a sufficient thickness to minimize wasteful energy dissipations sideways and downwards. With reference to the cover plates, several choices are open regarding the insulation of the same yielding different rates of conductive transfers depending upon the particular type of installation. Where it is desired to discourage or prevent a conductive transfer to the floor strip above the cover plate, the same is provided with sufficient insulation to discourage or prevent such transfer. The insulation for the cover plate in Figures 3 and 4 is indicated by the reference numeral 44. Another manner of insulating the cover plate is to provide a greater thickness of insulation near the conditioning unit source than at the point furthest therefrom and as the distance from the source increases, the relative effectiveness of the insulation may be lessened at a progressively diminishing rate, to compensate for the cooling of the conditioned air as it progresses through the conduit to provide a uniform exchange to the floor strip in its entirety. Still another variation will be described in relation to Figure 6.

Figures 5 and 6 show an alternative construction for attaching the cover plates and fluid diversion heads in position on the body.

In the construction shown in these two views, the edges of the body 21a which define the slot 22a are turned upwardly to form upstanding collars 44, 45. By means of a stamping operation or by other suitable means, the material of the collars 44, 45, at regularly spaced intervals are stamped or otherwise cut to produce spring tensioned engaging lugs 46 at regularly spaced intervals throughout the length of the collars 44, 45. In Figure 6, the cover plates are indicated by the reference numeral 47. In order that the cover plates 47 may be secured in position, they are formed with channel like members 48, 49 along the longitudinal edges, each channel member being formed with an inturned projection 50 which will engage under the lugs 46. The cover plates 47 can be attached to the body 21 by simply placing them over the continuous slot with the collars 44, 45 in the channels 48, 49 and then by pressing the plate downwardly the projections 50 to pass over the lugs 46 and engage thereunder.

Figure 5 illustrates another modified form of effecting a heat transfer to the floor immediately above the cover plate. In that construction, the cover plate which is identified by the numeral 51 has the portion which lies between the collars 44, 45 depressed so that it will lie below the upper edges of the collars 44, 45. The cover plates 51 are formed with fluid diversion means 52 hereinafter referred to as robbers. The robbers 52 are formed by partially cutting through the material so that the means can be bent down into the fluid and divert a small portion of the fluid through the opening thus formed. The robbers may be adjusted so as to vary the amount of fluid allowed to pass therethrough, in accordance with a predetermined formula to insure a uniform energy exchange to the floor strip in its entirety or to increase the energy transfer for locations which require such increase. The cover plate 51 is formed with attaching means along each edge consisting of channel like members 53, 54 similar to the channel members 48, 49. The cover plate 51 is attached in the same manner as the cover plate 47. When the continuous conduit A is brought into place against the underside of the floor, an air space is formed between the cover plate 51 and the floor and heat is transferred to the floor above, the amount of heat transferred depending on the amount of insulation and the adjustment of the robbers. The convector outlet which is indicated by the numeral 55 is provided with channel like connecting members 56, 57 similar in construction to the channel like members 48, 49. The end walls 58, 59 have at their lower end an outwardly projecting flange 60 which registers and abuts against the ends of the cover plate or is overlapped by the cover plates. The air diverted by the robbers can either be returned to the main conduit or provision can be made to deliver it to the room through the convector outlets.

Figure 7:
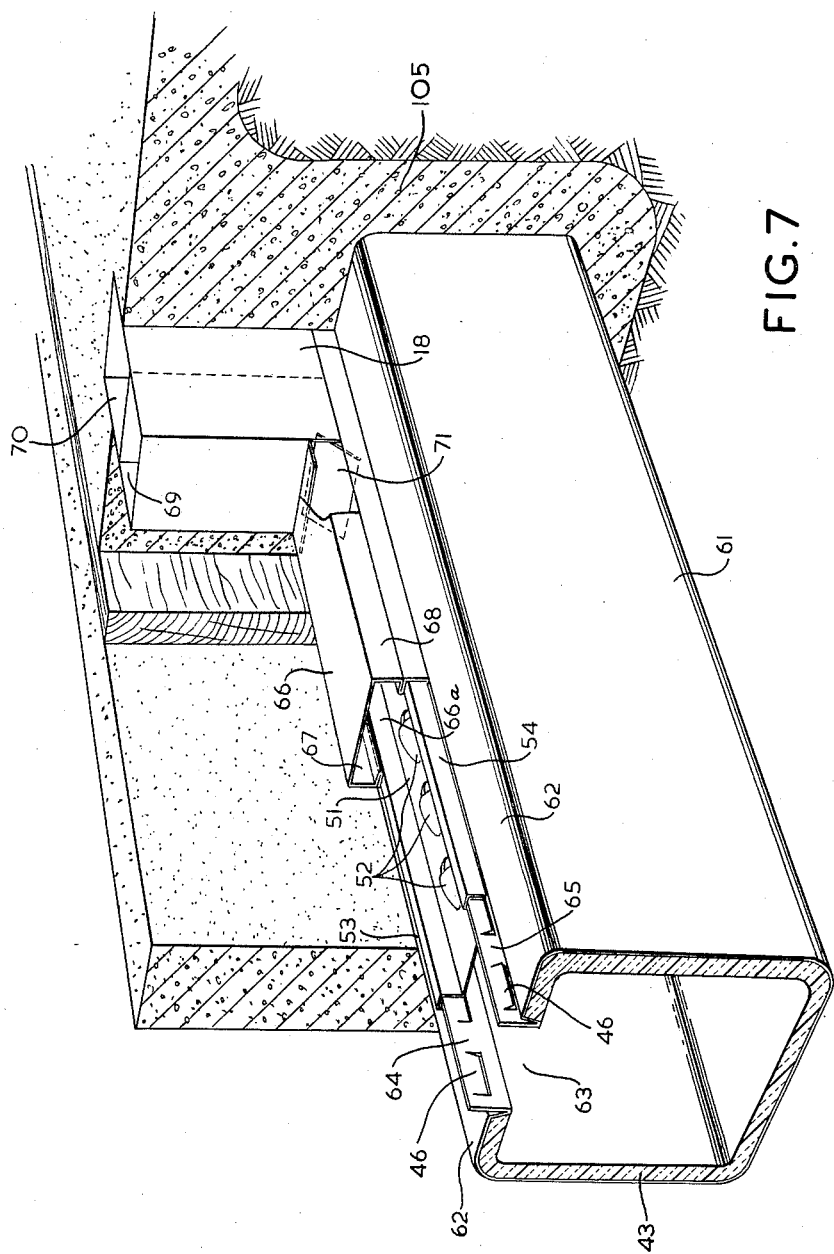
Figure 7 illustrates a conduit section which is rectangular in cross section.

Figure 7 illustrates a modified form of conduit unit which is shown in Figure 2 and consists of the body 61 which is rectangular in cross section and has its top wall 62 formed with a continuous slot 63, the edges of the wall 62 which define the slot 63 being bent upwardly to form a pair of upstanding collars 65, 64 extending longitudinally of the top wall. The collars 64, 65 are similar to the collars 44, 45 and are stamped or otherwise processed to form the spring tension lugs 46 at regularly spaced intervals throughout the length of each of the collars. The continuous slot 63 is closed by the cover plate 51 in the manner hereinbefore described the cover plate being provided with robbers 52. A channel member 66 which has downwardly extending side walls 67, 68 the bottom portions of the side walls being shaped so that they will snap over the channel members 53, 54. By this means the channel member 66 can be mounted in place over the cover plate 51 and thus form a conductive conduit 66a which is in communication with the main conduit through the robbers 52. In the present modification the fluid diversion head 18 is provided or formed with a discharge outlet 69 which communicates with the conductive conduit 66a and a conductor discharge outlet 70 which communicates with the interior of the body 61 of the main conduit. The damper 71 provides a regulative means to govern the rate of discharge from the conductive conduit 66a into the discharge outlet 69.

The conduit sections may be joined together by lapping the adjoining ends or by any other suitable method presently in use for joining conduit sections. As the manner of connecting the sections together does not form part of the present invention, the specific means have not been described since any skilled person will know one or several methods for doing so.

When the conduit has been completely assembled in position, the pouring of the cement is completed so that the conduit is buried in the cement foundation.

What I claim as new and desire to protect by Letters Patent of the United States of America is:

1. A heat transfer system for a building comprising in combination air heating and circulating means, an air supply conduit connected to said circulating means, a continuous slot formed therein and extending longitudinally of said conduit, a plurality of heat transmitting panels closing said slot whereby heat is transmitted to a floor, wall, or ceiling of said building whence heat is radiated to the space to be heated, insulating material applied to said heat transmitting panels, the insulating material of the panels most proximate to the heat circulating means having substantially greater thermal insulation quality than the subsequent panels more remote from said circulating means.

2. A heat transfer system according to claim 1 the additional element of air diversion outlets mounted on said slot between a pair of heat transmitting panels, said outlet communicating with said conduit and the interior of the building to deliver conditioned air directly thereto.

3. In a heat transfer system according to claim 1 in which each unit has oppositely disposed and longitudinally extending collars defining said slot and a member carried on each collar engaging and interlocking with a member carried on the longitudinal edges of the panel members.

4. In a heat transfer system according to claim 1, an additional element of air diversion units interchangeable with said panels, a pair of oppositely disposed collars extending along the top edge of each unit, a member carried on each collar, a complemental member carried on the longitudinal edges of said panel members and diversion units, said members and complemental engaging members interlocking with each other.

5. In a heat transfer system for a building having a floor, walls and ceiling having in combination air and heat circulating means, an air supply conduit formed from a plurality of units in end-to-end relationship each unit comprising a casing member provided with collars along oppositely disposed longitudinal edges, which collars define a continuous gap therebetween, a heat exchange element bridging said gap and means removably attaching the longitudinal edges of the heat exchange element to said collars, said means comprising a member carried on each collar and an interlocking member carried on the longitudinal edges of the heat exchange element interlocking with its related member on the collar, whereby the heat exchange element and the casing are formed into an integral unit by sliding the interlocking member over the members carried on the collars.

6. In a heat transfer system according to claim 5 in which the member carried by the collar is an inverted U-shaped channel and the interlocking member consists of a channel arranged to receive and retain therein the U-shaped channel.

7. In a heat transfer system according to claim 5 in which the member carried by the collar is an inverted U-shaped channel having a resilient free arm and the interlocking member consists of resilient lugs arranged to receive and retain therein the U-shaped channel.

8. A heat transfer system for a building comprising in combination air heating and circulating means, an air supply conduit connected to said circulating means, a continuous slot formed in and extending longitudinally of said conduit, a plurality of heat transmitting panels closing said slot whereby heat is transmitted to a floor, wall or ceiling of said building whence heat is radiated to the space to be heated, the panels most proximate to the heat circulating means having substantially lower thermal conductivity than the subsequent panels more remote from said circulating means.

9. In a heat transfer system according to claim 8 in which the longitudinal edges of the slot have formed thereon oppositely disposed longitudinally extending interlocking engaging means, complemental engaging means carried on the longitudinal edges of the panels interlocking and engaging with the interlocking means formed on the edges of said slot.

10. In a heat transfer system according to claim 8 the additional element of an air diversion unit and in which the longitudinal edges of the slot have formed thereon oppositely disposed longitudinal interlocking engaging means, complemental interlocking engaging means carried on the longitudinal edges of the panels and the diversion unit interlocking and engaging with the interlocking engaging means carried on the longitudinal edges of the slots.

References Cited in the file of this patent

UNITED STATES PATENTS

| | | |
|---|---|---|
| 423,357 | Tourangin | Mar. 11, 1890 |
| 908,237 | Gamble | Dec. 29, 1908 |
| 1,070,382 | Bradbury | Aug. 12, 1913 |
| 1,399,503 | McCrae | Dec. 6, 1921 |
| 1,995,481 | Myers | Mar. 26, 1935 |
| 2,206,119 | Persons | July 2, 1940 |
| 2,629,309 | Lahti | Feb. 24, 1953 |
| 2,662,744 | Leadbetter et al. | Dec. 15, 1953 |
| 2,668,666 | Anderson | Feb. 9, 1954 |
| 2,707,493 | Bonvillian et al. | May 3, 1955 |
| 2,756,000 | Anderson | July 24, 1956 |

OTHER REFERENCES

Heating, Ventilating, Air Conditioning Guide (1945 edition), (pub. A. S. H. V. E.), chapter 31,